Feb. 7, 1961  J. WORDSWORTH  2,970,832
HYDROPNEUMATIC SUSPENSION SYSTEMS
Filed Dec. 8, 1959  4 Sheets-Sheet 1
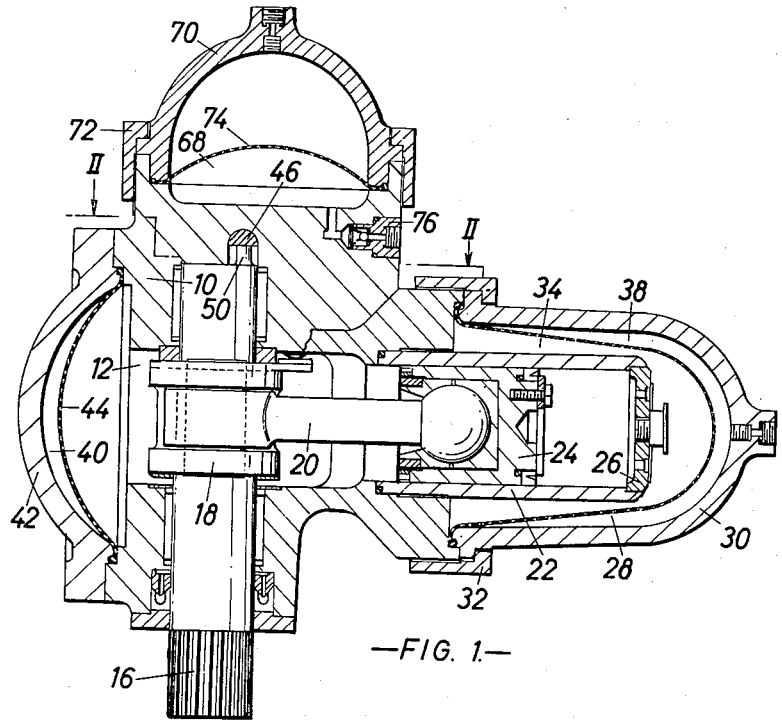
—FIG. 1.—
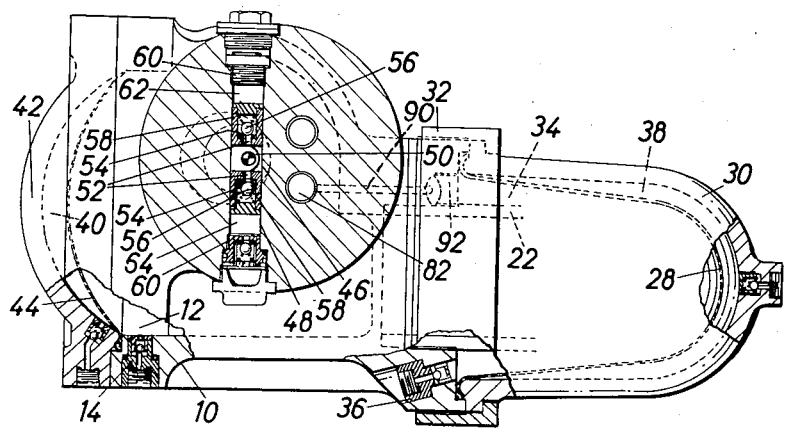
—FIG. 2.—
Inventor
JACK WORDSWORTH
By
Mead, Browne, Schuyler & Beveridge
Attorneys

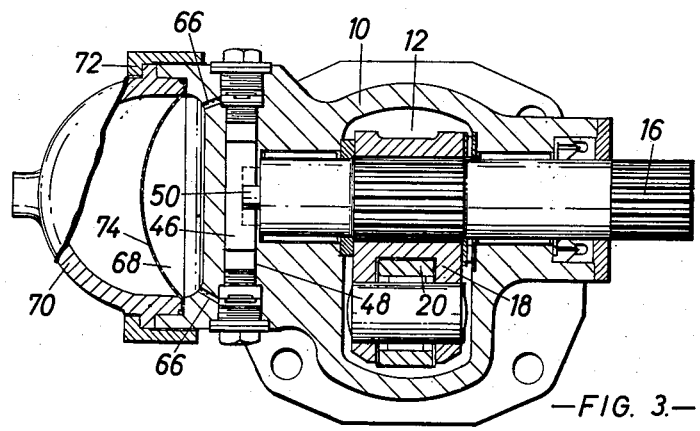
—FIG. 3.—
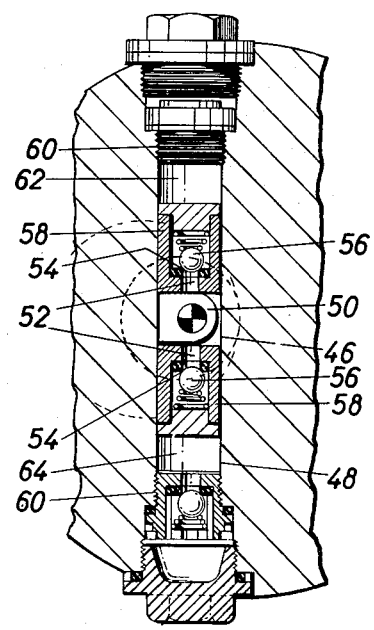
—FIG. 2a.—

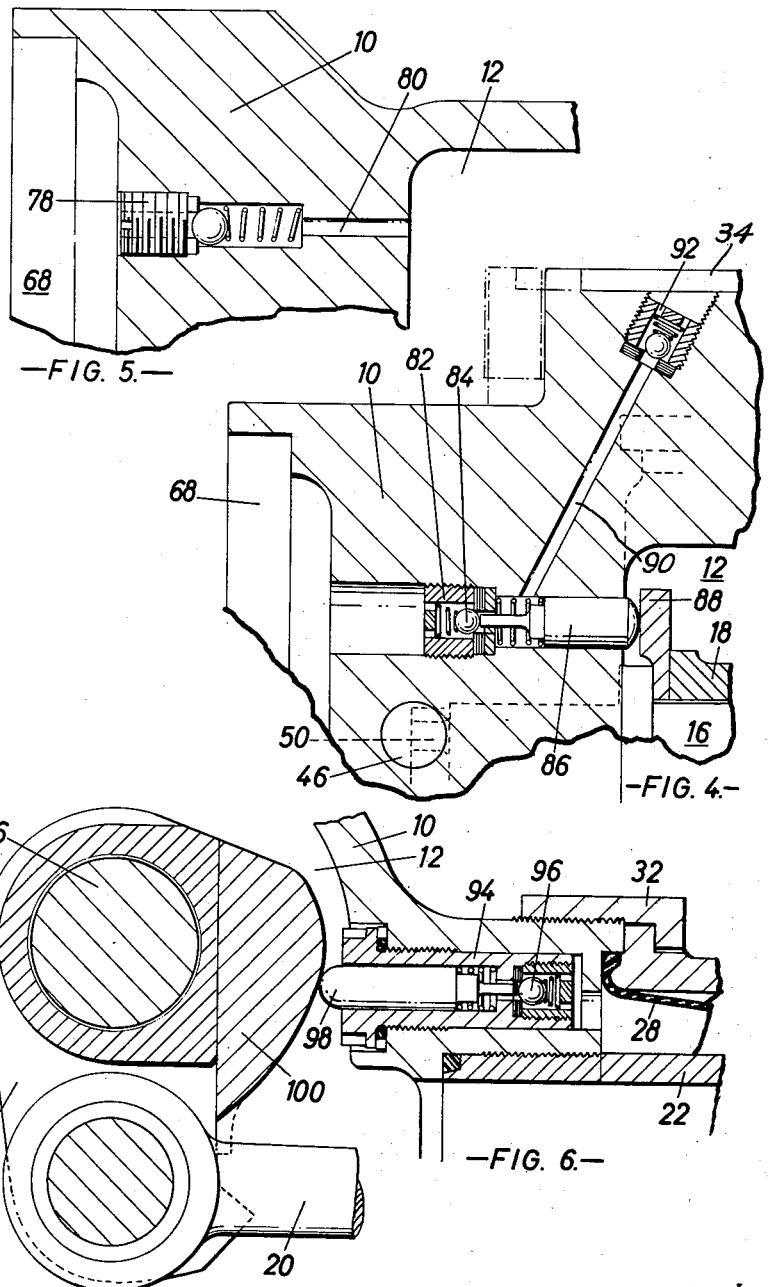

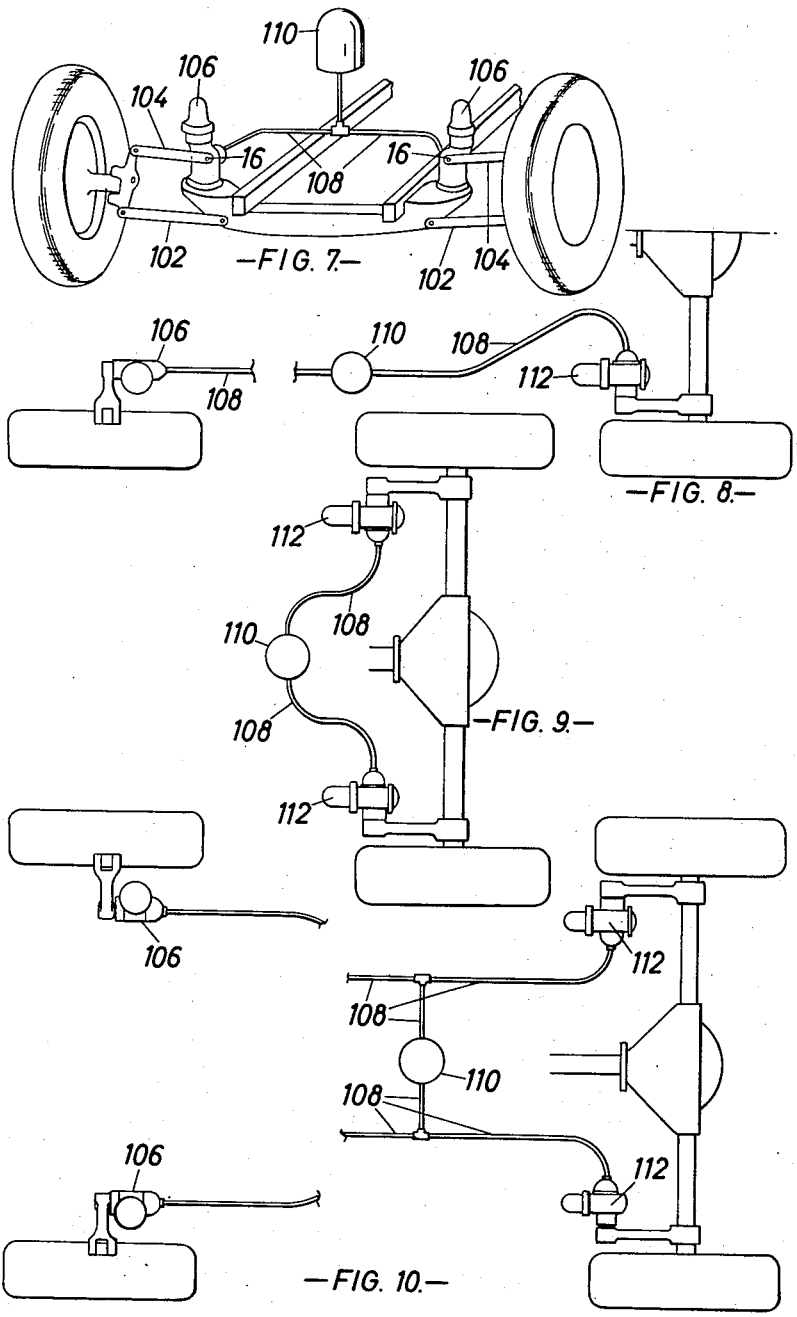

United States Patent Office 2,970,832
Patented Feb. 7, 1961

2,970,832

HYDROPNEUMATIC SUSPENSION SYSTEMS

Jack Wordsworth, York, England, assignor to Armstrong Patents Co. Limited, Beverley, England, a company of Great Britain Filed Dec. 8, 1959, Ser. No. 858,109

Claims priority, application Great Britain Dec. 11, 1958

8 Claims. (Cl. 267—15)

This invention concerns hydro-pneumatic suspension systems for vehicles such as automobiles, and relates particularly to systems incorporating means for maintaining a substantially constant attitude between the sprung and unsprung masses of a vehicle.

A hydro-pneumatic suspension device usually incorporates mutually telescoping members between which are confined a volume of non-compressible fluid such as a hydraulic medium and a volume of compressible fluid such as air, the compressible fluid acting as a pneumatic suspension spring to support the weight of the vehicle. In the more advanced types of such devices the compressible and non-compressible fluids are separated from one another by means such as a flexible or elastic diaphragm, and the volume of one or other of the fluids is variable by means of a pump operable responsive to vehicle riding movements, and a relief valve in order to maintain predetermined positions of the telescoping members relative to one another and hence to maintain a constant attitude between the sprung and unsprung masses of the vehicle.

Whilst such devices afford excellent riding characteristics to a vehicle to which they are fitted, a disadvantage frequently arises in that, should the predetermined relative positions between the telescoping members be disturbed due to the advent of increased loading on the vehicle, there is, at the best, a short delay before operation of the pump increases the volume of fluid concerned to restore those relative positions; whilst if the vehicle is stationary at the time the load increase occurs, restoration of said relative positions is not effected until the vehicle is subsequently set in motion.

It is an object of the invention to provide means for overcoming this disadvantage and for eliminating or at least substantially reducing the time taken to restore the telescoping members to their predetermined relative positions.

According to the present invention a vehicle hydropneumatic suspension system comprises a hydro-pneumatic suspension device having mutually telescoping piston and cylinder mean adapted for connection one to the sprung mass and the other to the unsprung mass of a vehicle, said piston and cylinder means confining between them a volume of hydraulic medium and a volume of gaseous medium separated by a flexible or elastic diaphragm, a reservoir of hydraulic medium and a relief valve adapted on the attainment of predetermined relative positions between said piston and cylinder means to exhaust excess hydraulic medium from said confined volume thereof back into said reservoir, characterized by pump means in said suspension device and adapted to pump hydraulic medium from said reservoir into a hydraulic pressure accumulator communicating with said confined volume of hydraulic medium, and a non-return regulator valve between said accumulator and said confined volume of hydraulic medium and operable by said piston and cylinder means, on contraction thereof, to admit hydraulic medium from said accumulator to said confined volume of hydraulic medium whereby to restore the predetermined relative positions of said piston and cylinder means.

The hydraulic pressure accumulator may be formed integrally with or separately from the suspension device, and in the latter case one hydraulic pressure accumulator may serve a plurality of suspension devices. The or each pressure accumulator may be provided with a blow-off valve adapted to open when the pressure in said accumulator reaches a predetermined maximum value.

Preferably the or each suspension device comprises an at least partly hollow body, a hydraulic cylinder presented by said body, a semi-rotary or rockable shaft or spindle within the interior of said body, said interior constituting the hydraulic medium reservoir, means attachable to the shaft being provided externally of the body and adapted for the application of vehicle suspension movements thereto, a piston displaceable in the cylinder, means connecting the piston to the shaft for reciprocation of said piston in said cylinder responsive to turning movements of the shaft, an elastic diaphragm co-operating with said cylinder to define a chamber receiving said confined volume of hydraulic medium, hydraulic medium flow restricting means between said cylinder and said chamber, said means serving to restrict the flow of hydraulic medium between the cylinder and chamber due to piston displacements, and means enclosing said diaphragm to define therewith a totally enclosed pneumatic chamber containing a gaseous medium and constituting a pneumatic suspension spring.

In such a construction the pump may conveniently be operated directly or indirectly from the rockable shaft or spindle and preferably is a double-acting pump having its plunger relieved at a central region to receive a driving spigot arranged eccentrically at one end of said rockable shaft.

Where the pressure accumulator is formed integrally with the suspension device, it may, in the particular construction referred to above, be arranged at a region of said body spaced from said hydraulic cylinder but adjacent the hydraulic reservoir. The said body may, moreover, with advantage comprise a second pneumatic chamber arranged on the side of the piston remote from the first pneumatic chamber and having one face defined by a flexible diaphragm acted upon by the hydraulic medium in said reservoir.

The invention will be further described by way of example with reference to the accompanying drawings, in which:

Fig. 1 is a longitudinal axial section of one suspension device constructed in accordance with the invention;

Fig. 2 is a section on the II—II of Fig. 1;

Fig. 2a is an enlarged detail of Fig. 2;

Fig. 3 is a section taken on a plane perpendicular to that of Fig. 1;

Fig. 4 is a sectional detail of a regulator valve;

Fig. 5 is a sectional detail of a blow-off valve;
Fig. 6 is a sectional detail of a relief valve; and
Figs. 7 to 10 are diagrammatic representations of a number of further suspension systems embodying the invention.

Wherever appropriate in the several figures, like reference numerals are employed to denote like parts.

The hydro-pneumatic suspension device shown in Figs. 1 to 6 of the drawings includes a body 10 formed internally with a chamber 12 constituting a reservoir for hydraulic medium, said reservoir being initially filled with hydraulic medium through a filling valve 14. Within the body 10 is journalled one end of a semi-rotary or rockable shaft or spindle 16, the other end of which extends from said body for connection in any suitable manner to an appropriate part of a vehicle, and secured to said spindle is a crank plate 18, the free end of which provides a pivotal connection for a piston connecting rod 20. A cylinder 22 is threadedly engaged with and extends from the body 10 and slidingly houses a piston 24 secured to the free end of the connecting rod 20, said cylinder being closed at its end opposite that at which the connecting rod enters it by an apertured and/or valved member 26 constituting a fluid flow restricting means. The cylinder 22 is surrounded by a flexible diaphragm 28 which is in turn enclosed and secured to the body 10 by means of a domed end cap or cupola 30 retained on the body 10 by a threaded collar 32, the cylinder 22 and the space or chamber 34 between it and the flexible diaphragm 28 being filled with hydraulic medium admitted through a filling valve 36. The space 38 bounded by the flexible diaphragm and the cupola 30 is filled with a pneumatic medium under pressure, which acts as a pneumatic suspension spring to balance the load applied to the hydraulic medium in space 34 by the piston 24, and a similar pneumatic spring, comprising an enclosed space 40 defined between a domed end cap 42 and a flexible diaphragm 44 arranged on the opposite side of the reservoir 12 from the cylinder 22, is provided to cushion rebound strokes of the piston 24.

It will be appreciated that, when the suspension device described above is mounted on a vehicle, with the body 10 secured to, say, the vehicle frame, and the spindle 16 connected to a wheel mounting, the position of the piston 24 within the cylinder 22 is a measure of the relative attitude of said frame and wheel mounting. This feature is employed in the invention to retain a desired particular attitude between the vehicle frame and wheel mounting i.e. to ensure that, at all loads, the frame remains at a constant riding height. For this purpose, the suspension device shown incorporates a hydraulic pump comprising a plunger 46 housed in a bore 48 formed in the housing 10, and relieved at its central region so as to receive a driving pin 50 extending axially from and eccentrically of the spindle 16. The central relieved region of the plunger 46 communicates directly with the reservoir 12, and from each side of said relieved region, there leads a passage 52 terminating in a valve seat 54 against which is resiliently urged a ball valve member 56 of a recuperation valve 58. The ends of the bore 48 are closed by non-return valves 60 between which and the adjacent recuperation valves 58 are defined chambers 62 and 64 respectively. The delivery side of each non-return valve 60 communicates with one of a pair of delivery passages 66 (Fig. 3).

The delivery passages 66 open into a chamber 68 of a hydraulic pressure accumulator comprising a further domed end cap or cupola 70 secured by means of a threaded collar 72 to the body 10, and between which and said body is likewise secured a flexible diaphragm 74. A filling valve 76 (Fig. 1) is provided to facilitate initial filling of the chamber 68 with hydraulic medium, and a blow-off valve 78 (Fig. 5) arranged to exhaust excess hydraulic medium from the chamber 68 on the attainment of a predetermined maximum pressure therein opens into a passage 80 leading to the reservoir 12. The chamber 68 of the accumulator is further provided (Fig. 4) with a regulator valve 82, a ball valve member 84 of which is adapted for unseating by means of a plunger 86 resiliently urged against a cam 88 carried by the crank plate 18. The valve member 84 normally closes communication between the chamber 68 and a passage 90 leading, by way of a non-return valve 92, to the confined space 34.

In the operation of the suspension device described, that proportion of the vehicle weight which is carried by the device is applied through the spindle 16 to the piston 24 and transmitted thereby to the hydraulic medium in cylinder 22 and confined space 34, the pressure of said medium being balanced by that of the pneumatic medium in the chamber 38. Normal riding movements of the vehicle i.e. normal vertical oscillatory movements between the vehicle frame and wheel mounting are translated into rotary oscillatory movements of the spindle 16, and set up reciprocation of the piston 24 in the cylinder 22, and the flow restricting means 26 provide a shock absorbing action by offering restriction to the consequent movement of hydraulic medium between the cylinder 22 and space 34. Severe displacements of the piston caused by passage of the vehicle over a bump are cushioned by the pneumatic medium in chamber 38, and similarly, rebound strokes of the piston are cushioned by the pneumatic medium in chamber 40, via the hydraulic medium in the reservoir 12 and behind the piston.

The above-mentioned rotary movements of the spindle 16 also cause the pin 50 on the inner end of said spindle to reciprocate the pump plunger 46 in its bore 48, thus delivering hydraulic medium from the reservoir 12 into the hydraulic accumulator pressure chamber 68. When the pressure in the latter has reached its predetermined value, the blow-off valve 78 opens and, in conjunction with continued pumping, acts to maintain the said predetermined pressure in the chamber 68. This condition prevails so long as the piston 24 is at a desired mean position within the cylinder 22, as governed by a relief valve 94 (Fig. 6) having a ball valve member 96 adapted for unseating by a plunger member 98 displaceable by a cam 100 carried by the crank plate 18, the cam being so angularly positioned on the crank plate 18 as to cause the plunger to be incident upon the valve member 96 for unseating the same when the piston 22 attains said mean position. Should the loading upon the vehicle increase, however, corresponding to an anti-clockwise rotary movement of the spindle 16 causing the piston 24 to enter further into the cylinder 22, the cam 100 allows the plunger 98 resiliently to retract from the valve member 96, and the latter engages firmly upon its seat. At the same instant, however, the cam 88 causes the plunger 86 to unseat the valve member 84 of the regulator valve 82, and hydraulic medium under pressure from the accumulator chamber 68 is allowed to pass to the non-return valve 92 and hence into the confined space 34. The addition of hydraulic medium to the space 34 thus forces the piston 24 back towards its desired mean position, at which the plunger 98 becomes incident upon the relief valve member 96, and thereafter repeated momentary opening of the relief valve 94, allied to repeated momentary replenishment of the hydraulic medium in space 34 from the accumulator chamber 68 via regulator valve 82, will serve to maintain the piston in said mean position, and hence will maintain a desired relationship of the vehicle frame and wheel mounting i.e. a desired riding height. In the converse case, when the vehicle load is decreased, clockwise movement of the spindle 16 results in a movement of piston 24 to withdraw somewhat from cylinder 22, and hence the cam 100 displaces the plunger 98 to unseat ball valve member 96 of the relief valve, so that hydraulic medium is allowed to exhaust from the confined space 34 into the reservoir 12 until the piston mean position has been restored. The arrangement of the regulator valve cam 88 is, of course, such that the regulator valve does not open during such a time.

It will be appreciated that the invention allows not only for instantaneous compensation of the vehicle riding height to be carried out by the relief valve 94 when the vehicle load is decreased, but also, due to the provision of the pressure accumulator, instantaneous compensation occurs also when the vehicle loading is increased, even when the vehicle is stationary.

Figs. 7 to 10 illustrate a number of embodiments of the invention employing a pressure accumulator separate from the or each suspension device.

Fig. 7 is a diagrammatic representation of a vehicle front suspension wherein each wheel mounting includes a pair of spaced lever arms 102, 104 of which the upper arm 104 is secured to the spindle 16 of a suspension device 106 constructed exactly as described with reference to Figs. 1 to 6, except for the omission of an internal pressure accumulator. Instead, the two suspension devices 106, although each retaining its own hydraulic pump, relief, blow-off and regulator valves, are connected by conduits 108 to an external pressure accumulator 110, which is supplied with hydraulic medium from both hydraulic pumps, and which, when so required by operation of one or both regulator valves, in turn supplies hydraulic medium under pressure to the confined spaces 34 of the suspension devices.

A similar arrangement, appropriately adapted to the slightly different circumstances involved, is shown in Fig. 8, wherein the common external pressure accumulator 110, via conduits 108, co-operates with a suspension device 106 of a front wheel mounting, and a suspension device 112 of a rear wheel mounting; and a further similar arrangement applied to a rear wheel suspension is shown in Fig. 9. It will be clear from Figs. 7 to 9 that the principle of providing a single pressure accumulator situated externally of the suspension devices themselves may be extended to both the front and rear suspensions of a vehicle, and such an arrangement is illustrated in Fig. 10.

I claim:

1. In a vehicle hydro-pneumatic suspension system of the type comprising a hydro-pneumatic suspension device having mutually telescoping piston and cylinder means adapted for reciprocation responsive to vehicle riding movements, said piston and cylinder means confining between them a volume of hydraulic medium and a volume of gaseous medium, an elastic diaphragm separating said hydraulic medium from said gaseous medium, a reservoir of hydraulic medium and means including a relief valve adapted on the attainment of a predetermined relative position between said piston and cylinder means to exhaust excess hydraulic medium from said confined volume thereof back into said reservoir; the improvement comprising pump means in said suspension device, an hydraulic pressure accumulator communicating with said confined volume of hydraulic medium, said pump means being operable responsive to said vehicle riding movements to pump hydraulic medium from said reservoir into said hydraulic accumulator, and means including a non-return regulator valve between said accumulator and said confined volume of hydraulic medium and operable by said piston and cylinder means, on contraction thereof, to admit hydraulic medium from said accumulator to said confined volume of hydraulic medium for restoring said piston and cylinder means to said predetermined relative position.

2. In a vehicle hydro-pneumatic suspension, at least one hydro-pneumatic suspension device comprising an at least partly hollow body, a hydraulic cylinder secured to and extending from said body, a rockable shaft journalled in said body and extending within the hollow interior thereof, said interior constituting a hydraulic medium reservoir, a piston displaceable in said cylinder, means connecting said piston and said shaft for reciprocation of said piston responsive to turning movements of said shaft, an elastic diaphragm secured to said body and co-operating with said cylinder to define therewith a hydraulic chamber, hydraulic medium flow restricting means between said cylinder and said chamber for restricting the flow of hydraulic medium between said cylinder and chamber due to piston displacements, means secured to said body and enclosing said diaphragm to define therewith a totally enclosed pneumatic chamber constituting a pneumatic suspension spring, pump means in said body communicating with said reservoir and operable responsive to turning movements of said shaft, and means including a hydraulic relief valve in said body for establishing communication between said hydraulic chamber and said reservoir when said shaft departs in one direction from a predetermined angular position relative to said body; a hydraulic pressure accumulator connected to said pump means, and means including a non-return regulator valve for connecting said accumulator to said hydraulic chamber when said shaft departs in the other direction from said predetermined position.

3. A suspension system as set forth in claim 2, wherein the pressure accumulator is separate from said suspension device.

4. A suspension system as set forth in claim 3, wherein the pressure accumulator is connected to a plurality of suspension devices.

5. A vehicle hydro-pneumatic suspension unit comprising an at least partly hollow body, a hydraulic cylinder secured to and extending from said body, a rockable shaft journalled in said body and extending within the hollow interior thereof, said interior constituting a hydraulic medium reservoir, a piston displaceable in said cylinder, means connecting said piston and said shaft for reciprocation of said piston responsive to turning movements of said shaft, an elastic diaphragm secured to said body and co-operating with said cylinder to define therewith a hydraulic chamber, hydraulic medium flow restricting means between said cylinder and said chamber for restricting the flow of hydraulic medium between said cylinder and chamber due to piston displacements, means secured to said body and enclosing said diaphragm to define therewith a totally enclosed pneumatic chamber constituting a pneumatic suspension spring, pump means in said body communicating with said reservoir and operable responsive to turning movements of said shaft, means including a hydraulic relief valve in said body for establishing communication between said hydraulic chamber and said reservoir when said shaft departs in one direction from a predetermined angular position relative to said body, hollow cap means secured to said body, a second elastic diaphragm clamped to said body between said cap means and said body and co-operating with said body and cap means to define a hydraulic pressure accumulator, said body being formed with passage means between said pump means and said accumulator, and means including a non-return regulator valve for connecting said accumulator to said hydraulic chamber when said shaft departs in the other direction from said predetermined position.

6. A suspension unit as set forth in claim 5, wherein said means including a hydraulic relief valve and said means including a non-return regulator valve comprises cam means on said shaft, a first valve operating member located in said body member between said cam means and said relief valve and displaceable by said cam means to open said relief valve on movement of said shaft in said one direction, and a second valve operating member located in said body member between said cam means and said regulator valve and displaceable by said cam means to open said regulator valve on movement of said shaft in said other direction.

7. A suspension unit as set forth in claim 5, wherein said pump means comprises a pump plunger having a central relieved portion, said body being formed adjacent said reservoir with a bore receiving said plunger, said plunger being formed with axial passages extending therethrough from said relieved portion to the plunger ends, said relieved portion communicating with said reservoir, an axially directed, eccentric pin extending from said shaft within said body and engaging in the relieved portion of said plunger, a pump inlet valve in each of said axial passages, a pump delivery valve closing each end of said body bore, and delivery passage means leading from each delivery valve to said pressure accumulator.

8. A suspension unit as set forth in claim 5, further comprising second hollow cap means secured to said body on the side of said shaft opposite the hydraulic cylinder, and a further elastic diaphragm clamped between said body and said second cap means, said further diaphragm defining one side of said reservoir and co-operating with said second cap means to define a further pneumatic chamber constituting a pneumatic spring adapted to cushion displacements of said piston in a rebound direction.

References Cited in the file of this patent

UNITED STATES PATENTS

| | | |
|---|---|---|
| 2,825,579 | Heiss | Mar. 4, 1958 |
| 2,923,557 | Schilling et al. | Feb. 2, 1960 |